United States Patent
Funakoshi

(10) Patent No.: US 6,246,188 B1
(45) Date of Patent: Jun. 12, 2001

(54) DIMMER APPARATUS

(75) Inventor: Hideaki Funakoshi, Osaka (JP)

(73) Assignee: Funai Electric Co., Ltd., Daito (JP)

(*) Notice: Subject to any disclaimer, the term of this patent is extended or adjusted under 35 U.S.C. 154(b) by 0 days.

(21) Appl. No.: 09/540,204

(22) Filed: Mar. 31, 2000

(30) Foreign Application Priority Data

Mar. 31, 1999 (JP) .................................................. 11-092972

(51) Int. Cl.$^7$ .................................................. H05B 37/00
(52) U.S. Cl. .................. 315/363; 315/169.3; 315/DIG. 4
(58) Field of Search ........................... 315/DIG. 4, 169.3, 315/76, 363

(56) References Cited

U.S. PATENT DOCUMENTS 5,742,134 * 4/1998 Wacyk et al. ......................... 315/307

FOREIGN PATENT DOCUMENTS 6-295577 10/1994 (JP) .

* cited by examiner

Primary Examiner—David Vu
(74) Attorney, Agent, or Firm—Evenson, McKeown, Edwards & Lenahan, P.L.L.C.

(57) ABSTRACT

A dimmer apparatus for adjusting the brightness of a display section for displaying time and the like. In the dimmer apparatus, a control section including a microcomputer and the like operates to decide which one of the keys has been pressed by decoding the contents of a code signal generated by pressing one of the keys in an operating section and a remotely controlled transmitting section. When "AUTO" on the menu screen for selectively setting the execution or non-execution of dimming control to be displayed on a monitor screen is selected, the control section functions as what executes the dimming control of the FL tube of the display section interlocked with a reproducing mode by controlling the display section so as to have the FL tube dimmed during the reproducing mode in which a reproduced image is displayed on the monitor screen upon deciding that either reproducing key of the operating section or reproducing key of the remotely controlled transmitting section has been pressed.

5 Claims, 1 Drawing Sheet

DIMMER APPARATUS

BACKGROUND OF THE INVENTION

1. Field of the Invention

This invention relates to a dimmer apparatus provided in an electronic equipment that has an image reproducing function such as a DVD player to adjust the brightness of a display section comprising a light-emitting means for displaying time and the like.

2. Description of the Related Art

A display section is normally provided in a video reproducing equipment such as a DVD player, video cassette recorder or the like. Further, counter gradations indicative of the reproducing position of a DVD or video tape and predetermined marks indicative of operating modes in addition to the present time are displayed in the display section.

A light-emitting means is employed in such a display section and one provided with a dimming function capable of adjusting its brightness is proposed. In the case of a DVD player, for example, a fluorescent display tube (hereinafter referred to as FL tube) whose brightness is easy to regulate by controlling the voltage or current is often used. By operating a dimmer key provided in the body or a remote controller, the brightness of the FL tube of the display section is decreased and by operating the dimmer key again, the brightness thereof is returned to the original state.

It becomes possible for a user to enjoy the atmosphere of a movie theater at home by decreasing the brightness of the display section by switching the brightness of the display section when a movie is watched at home. Thus, a home theater can readily be realized.

Notwithstanding, the dimmer key has to be especially operated to dim the display section at the time of reproduction in the case of the conventional dimmer apparatus, and this makes it necessary to operate both the reproducing and dimmer keys and complicates the operations accordingly.

Incidentally, in order to vary the brightness of such a display section, there is an apparatus disclosed in Japanese Patent Unexamined Publication No. Hei. 6-295577. However, this apparatus is intended not to dim the display section in the ordinary state of use in a so-called reproducing mode but to dim the display section in a particular range of time, for example, in sleeping hours.

SUMMARY OF THE INVENTION

An object of the present invention is to provide a dimmer apparatus to make controllable the dimming of a display section interlocked with the reproducing operation of a recording medium such as a DVD.

In order to achieve the above object, according to the invention, there is provided a dimmer apparatus which is provided in an electronic equipment having a function of reproducing an image recorded in a recording medium and used for adjusting brightness of a display section comprising light-emitting means for displaying time and counter gradations indicative of a reproducing position of the recording medium, the apparatus comprising: a decision section for deciding an operation of a reproducing key of the electronic equipment; and a dimmer section for controlling the light-emitting means so as to dim the light-emitting means during a reproducing operation when the operation of the reproducing key is decided by the decision section.

With this arrangement, the light-emitting means is dimmed by the dimmer section only during the reproducing operation when the operation of the reproducing key is decided by the decision section. Accordingly, it is unnecessary to operate a dimmer key whereby to dim the light-emitting means as in the conventional apparatus. The display section can automatically be dimmed in company with the reproducing operation.

DETAILED DESCRIPTION OF THE PREFERRED EMBODIMENT

Figure 1:
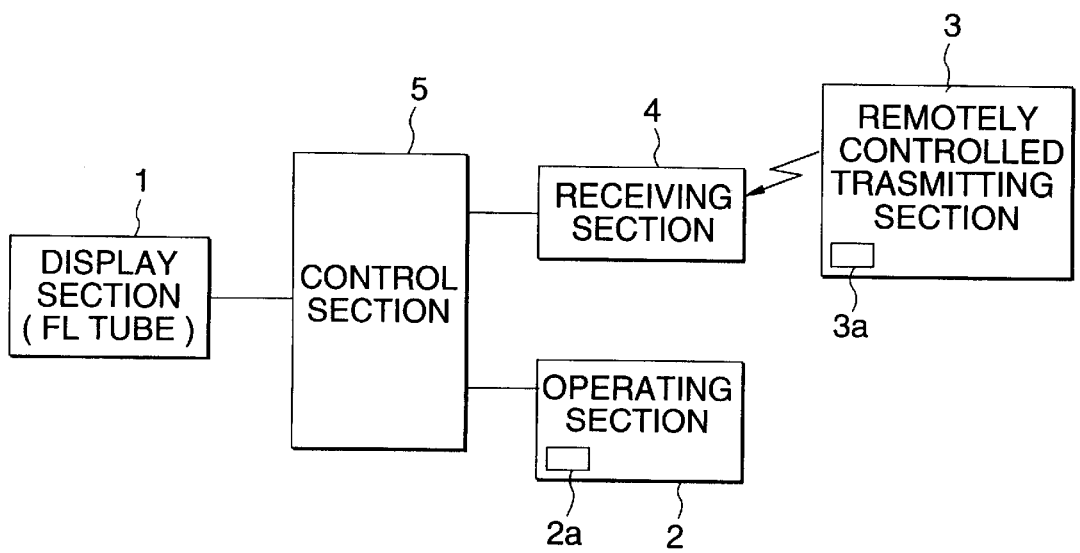
FIG. 1 is a block diagram of an embodiment of the invention.

An embodiment of the invention applied to a DVD player will be described with reference to FIGS. 1 and 2. FIG. 1 is a block diagram; and FIG. 2, a diagram illustrating the operation.

In FIG. 1, reference numeral 1 denotes a display section which is an FL tube as a light-emitting means for displaying counter gradations indicating time and reproducing position of a DVD (not shown), operating modes and the like, the display section 1 being capable of controlling the switching of brightness in two stages; 2, an operating section having a reproducing key 2a and operating keys for use in setting other operating modes; and 3, a remotely controlled transmitting section having a reproducing key 3a and operating keys for use in setting other operating modes like the operating section 2; when any one of the keys is pressed, a code signal as a radio signal such as an infrared signal corresponding to the key thus pressed is transmitted.

Further, reference numeral 4 denotes a receiving section for receiving a code signal from the remotely controlled transmitting section 3; and 5, a control section including a microcomputer and the like and operating to decide which one of the keys has been pressed by decoding the contents of the code signal generated by pressing one of the keys in the operating section 2 and the remotely controlled transmitting section 3 and to control each section in accordance with the operation of each key thus pressed. Moreover, the control section 5 causes a menu screen (see FIG. 2) for selectively setting the execution or non-execution of dimming control to be displayed on a monitor screen and when "AUTO" on the menu screen is selected, functions as what executes the dimming control of the display section 1 interlocked with a reproducing mode by controlling the FL tube of the display section 1 so as to have the FL tube dimmed during the reproducing mode in which a reproduced image is displayed on the monitor screen upon deciding that either reproducing key 2a of the operating section 2 or reproducing key 3a of the remotely controlled transmitting section 3 has been pressed.

When "AUTO" on the menu screen is selected in that case, the control section 5 may be programmed so that upon the detection of the contents of the code after the reproducing key 2a of the operating section 2 or the reproducing key 3a of the remotely controlled transmitting section 3 is pressed, two kinds of control including reproducing a DVD and dimming the display section 1 are performed. Incidentally, when any key other than the reproducing keys 2a and 3a is pressed during the time the dimming control is performed, the dimming control is stopped from being performed by the display section 1 so as to immediately restore the original brightness.

Figure 2:
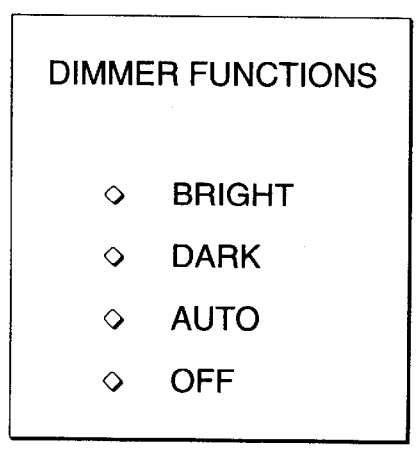
FIG. 2 is a diagram illustrating the embodiment of the invention in operation.

When "BRIGHT" on the menu screen in FIG. 2 is selected, on the other hand, the control section 5 functions as what always keeps the display section 1 bright irrespective of the operating states of the reproducing keys 2a and 3a and when "DARK" is selected, the control section 5 always keeps the display section 1 dark irrespective of the operating states thereof. When "OFF" is selected, further, the control section 5 functions as what always keeps the FL tube of the display section 1 in a light-off state.

At this time, the key-operation deciding process corresponds to a decision section; the dimming control over the FL tube of the display section 1 corresponds to a dimmer section; and the execution or non-execution of the dimming control by the user on the basis of the menu screen corresponds to a setting section.

While "AUTO" on the menu screen (see FIG. 2) has been selected, the FL tube of the display section 1 is dimmed in the manner interlocked with the reproducing mode without pressing a key (e.g., a dimmer key) for special use in dimming the FL tube as before when the code contents are decided and detected through the operation of the reproducing key 2a of the operating section 2 or the reproducing key 3a of the remotely controlled transmitting section 3 by means of the control section 5.

According to this embodiment of the invention, the display section 1 can be dimmed without particularly operating the dimmer key, thus making it possible to prevent the user from minding the brightness of the display section 1, when a home theater capable of providing the atmosphere of a movie theater is realized at home by reproducing a DVD.

Since the execution or non-execution of dimming control can be selected by the control section 5, moreover, the user is allowed to select either the execution or non-execution of dimming control of the FL tube of the display section 1 according to the user's liking.

Although it has been so arranged that the execution or non-execution of the dimming control is to be selected from the menu screen as shown in FIG. 2 according to this embodiment of the invention, such a selection needs not necessarily be made in the manner mentioned above. In other words, the dimming control of the FL tube of the display section 1 may be performed in company with the operation of the reproducing key 2a of the operating section 2 or the reproducing key 3a of the remotely controlled transmitting section 3.

Although a description has been given of a case where the brightness of the FL tube of the display section 1 is so controlled as to be switched in two stages according to this embodiment of the invention, further, the brightness thereof may needless to say be switched in three or more stages.

The menu screen of FIG. 2 is shown only by way of example and needless to say not limited to what is shown in FIG. 2.

Although a description has been given of a case where the FL tube is employed as the light-emitting means of the display section 1 according to this embodiment of the invention, the light-emitting means is not limited to the FL tube. It may be arranged that the display section 1 is constituted of, for example, a backlight type liquid crystal display; in short, it is only needed for the display section 1 to offer variable brightness.

Further, although the invention has been applied to the DVD player according to this embodiment thereof, it may also be applied to a video equipment such as a digital video reproducing equipment for reproducing a recording medium having digital image data recorded thereon or recording/reproducing it other than a DVD, video cassette recorder, laser disk player and the like with the effect of gaining the same result as in the above embodiment.

Moreover, the invention is not limited to the embodiment described above but may be changed and modified in various manners without departing from the spirit and scope thereof.

As described above, according to the invention, the light-emitting means is dimmed by the dimmer section only during the reproducing operation when the operation of the reproducing key is decided by the decision section. Accordingly, it is unnecessary to operate the dimmer key whereby to dim the light-emitting means. The display section can be dimmed in company with the reproducing operation. The dimmer apparatus is very convenient as it saves the trouble of pressing the dimmer key so as to prevent the user from minding the brightness of the display section.

What is claimed is:

1. A dimmer apparatus which is provided in an electronic equipment having a function of reproducing an image recorded in a recording medium and used for adjusting brightness of a display section comprising light-emitting means for displaying time and counter gradations indicative of a reproducing position of the recording medium, said apparatus comprising:
    a decision section for deciding an operation of a reproducing key of the electronic equipment; and
    a dimmer section for controlling the light-emitting means so as to dim the light-emitting means during a reproducing operation when the operation of the reproducing key is decided by said decision section.

2. The dimmer apparatus as claimed in claim 1, wherein the reproducing key is provided in each of an operating section and a remotely controlled transmitting section of the electronic equipment and wherein dimming control of the light-emitting means is performed by said dimmer section through the operation of any one of the reproducing keys.

3. The dimmer apparatus as claimed in claim 1, further comprising a setting section for selectively setting the execution or non-execution of dimming control of the light-emitting means by said dimmer section.

4. The dimmer apparatus as claimed in claim 1, wherein the light-emitting means includes a fluorescent display tube.

5. The dimmer apparatus as claimed in claim 1, wherein the electronic equipment includes a digital video equipment for reproducing or recording/reproducing a DVD as the recording medium.

* * * * *